(12) United States Patent
Stirlen et al.

(10) Patent No.: US 7,908,158 B2
(45) Date of Patent: Mar. 15, 2011

(54) SEAT ROUTINE EQUIPMENT MODEL

(75) Inventors: William Christopher Stirlen, Sandy, UT (US); Thomas Walter Mehl, Salt Lake City, UT (US)

(73) Assignee: Accenture Global Services Limited, Dublin (IE)

( * ) Notice: Subject to any disclaimer, the term of this patent is extended or adjusted under 35 U.S.C. 154(b) by 507 days.

(21) Appl. No.: 11/849,829

(22) Filed: Sep. 4, 2007

(65) Prior Publication Data

US 2009/0063204 A1   Mar. 5, 2009

(51) Int. Cl.
*G06Q 10/00* (2006.01)
(52) U.S. Cl. .......................................... 705/5
(58) Field of Classification Search ........................ 705/5
See application file for complete search history.

(56) References Cited

U.S. PATENT DOCUMENTS

| | | | | |
|---|---|---|---|---|
| 2002/0077871 A1* | 6/2002 | Udelhoven et al. | ............... | 705/5 |
| 2003/0036930 A1 | 2/2003 | Matos et al. | | |
| 2007/0143154 A1* | 6/2007 | Ashby et al. | ................... | 705/5 |
| 2008/0183512 A1* | 7/2008 | Benzinger et al. | ............. | 705/6 |

FOREIGN PATENT DOCUMENTS

WO   WO97/27556   7/1997

OTHER PUBLICATIONS

Dec. 10, 1987 "United, British Airways announce marketing merger." PR Newswire.*
"Optimal DYnamic Pricing of Inventories with Stochastic Demand over Finite Horizons" Management Science vol. 40, No. 8 (Aug. 1994), pp. 999-1020 Published by: INFORMS http://www.jstor.org/stable/2633090.*
Peng-Sheng You, Dynamic Pricing in Airline Seat Management for Flights with Multiple Flight Legs Transportation Science 1999.*
Canadian Office Action in Application No. 2,639,334, dated Aug. 6, 2010, 4 pages.

* cited by examiner

*Primary Examiner* — John W Hayes
*Assistant Examiner* — Tonya Joseph
(74) *Attorney, Agent, or Firm* — Fish & Richardson P.C.

(57) ABSTRACT

The subject matter of this specification can be embodied in, among other things, a process that includes defining software travel objects that are configurable to represent a variety of types of accommodations used in transportation of passengers, associating the software travel objects with configurable properties that specify accommodation attributes that affect a passenger's experience during travel, and receiving, through a user interface, information used to customize the configurable properties during run-time of a software application that manages travel reservations for accommodations. The process also includes outputting the customized configurable properties for use by a user in a selection of one or more of the accommodations during a travel reservation.

12 Claims, 12 Drawing Sheets

SEAT ROUTINE EQUIPMENT MODEL

TECHNICAL FIELD

This instant specification relates to travel accommodations, and, more particularly, to seat routine processes.

BACKGROUND

Certain online reservation systems are used to make travel reservations. For example, certain online reservation systems can receive a destination and date for travel from a user. The received destination and date of travel can be used as criteria to perform a search to determine whether a seat on an aircraft is available. The search may locate one or more seats that correspond to the received date and destination details.

SUMMARY

In general, this document describes provisioning travel accommodations.

In a first general aspect, a computer-implemented process is described, which provides customized attributes relating to a passenger's experience during travel that can be used to select accommodations when making travel reservations. The process includes defining software travel objects that are configurable to represent a variety of types of accommodations used in transportation of passengers, associating the software travel objects with configurable properties that specify accommodation attributes that affect a passenger's experience during travel, and receiving, through a user interface, information used to customize the configurable properties during run-time of a software application that manages travel reservations for accommodations. The process also includes outputting the customized configurable properties for use by a user in a selection of one or more of the accommodations during a travel reservation.

In a second general aspect, a system is described, which provides customized criteria for use in selecting an accommodation when making travel provisions. The system includes a data structure for software objects that are configurable to represent a plurality of types of accommodations that are used in transportation of passengers. The data structure includes configurable fields that are associated with aspects of accommodations that affect a passenger's travel experience. The system also includes a field customization module configured to receive input used to customize the configurable fields during run-time of a software application that manages travel provisions and a customer interface to present at least a portion of the customized configurable fields for use by a customer in selection of one or more of the accommodations during a travel provision.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
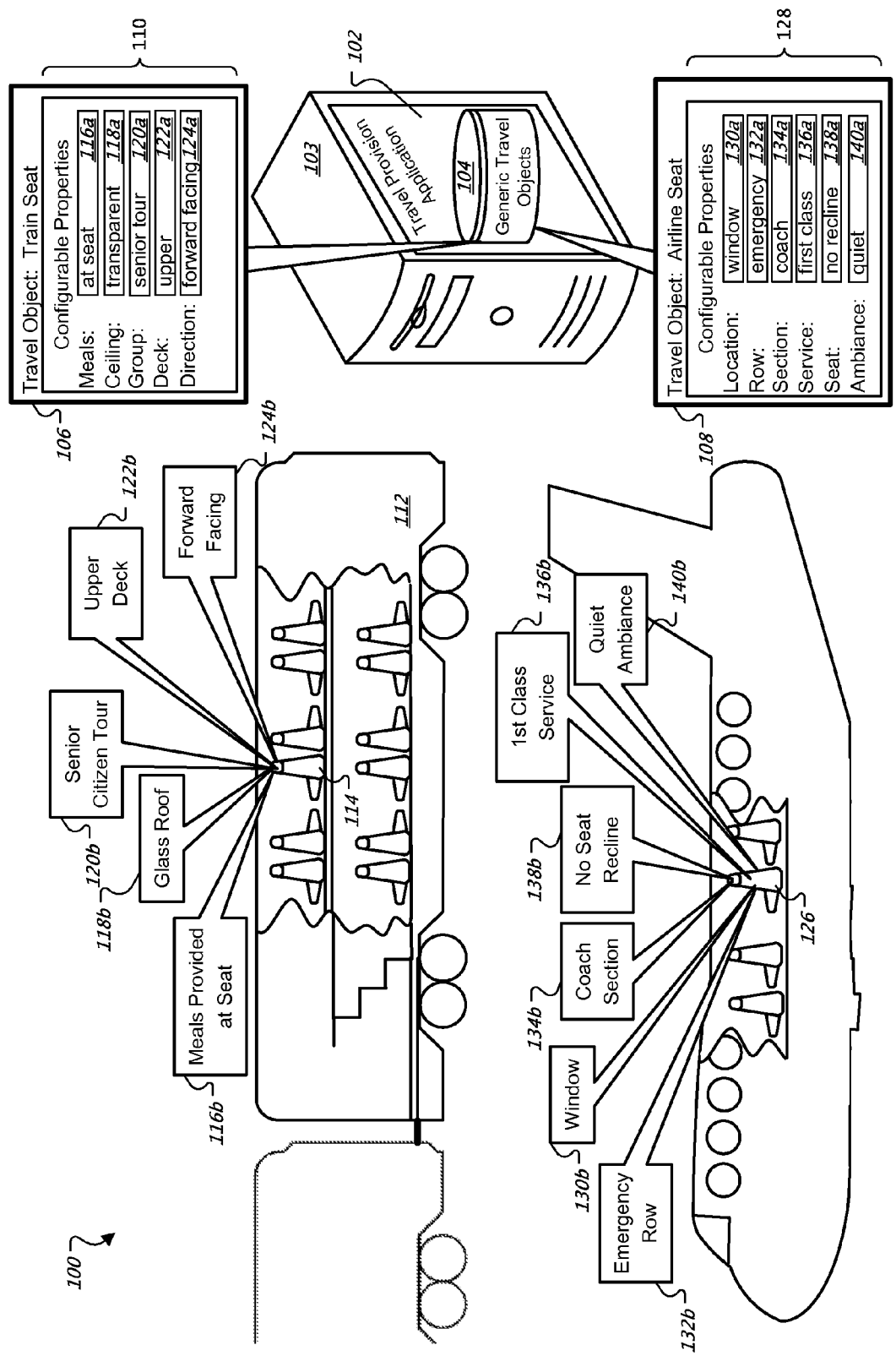
FIG. 1 is a diagram of an example system for configuring, customizing, and managing travel accommodations.

This document describes systems and techniques for configuring, customizing, and managing travel provisions as well as customized attributes relating to those provisions. Travel provisions can include one or more reservations, schedule requests, or cargo accommodation requests for a travel accommodation. For example, travel accommodations can include seats, rooms, or reserved space on passenger carriers such as a motor vehicle, a sea craft, an aircraft, or a train. In other examples, the travel accommodations also include rooms, or reserved space in a building, such as a hotel or a warehouse.

The system can include generic software objects that can be customized, or configured, to represent a variety of travel accommodations, For example, a user can configure a generic software object so that it represents a seat on an airplane. The user also can configure the same generic software object to represent a cabin on a cruise ship.

In some implementations, each customized software object is associated with properties that relate to conditions that influence a payload, such as passengers or cargo, during travel. For instance, the properties can indicate physical characteristics of the accommodation (also referred to as "equipment"). For example, a particular seat on a train may be associated with a property that describes a direction the seat is facing.

In certain implementations, equipment has properties that are associated with marketing characteristics of the accommodation. For example, a user can designate a particular bus seat as having a "sociable" property that indicates the seat is located in an area designated for passengers who wish to talk to each other. This property may be used to market the particular seat to users who wish to socialize with surrounding passengers.

Modification or configuration of the properties associated with travel accommodations can be configured, modified, ranked, and managed by a travel provision application during run-time (e.g., as opposed to during design-time) of the application 102. For example, a customer or ticket agent can use the travel provision application 102 to modify a travel accommodation and its specified attributes if the accommodation changes. For example, a train seat may have a property indicating that it is facing forward during travel from City A to City B. When the train returns from City B to City A, the travel direction for the seat may change. In this case, a user (either machine or human) can modify the property so that it indicates that the train seat faces backward during travel from City B to City A. A user can make this modification during the execution of travel provision application 102 without having to, for example, recompile the travel provision application.

In some implementations, a customer can access the travel provision application 102 to plan a trip. For example, the customer can reserve a travel accommodation, such as a train seat, for travel on a particular date. In certain implementations, a customer submits preferences, which the travel provision application 102 uses to identify a travel accommodation that most closely matches the submitted preferences. For example, the customer can submit a preference for a train seat that is located in a train car that is designated as having a sociable ambience.

The customer also can request an accommodation having specific physical amenities. For example, the customer can request that the accommodation include a reclining seat or be handicap accessible. The customer also can request that the accommodation have particular services. For example, the customer can request that the accommodation be associated with first class service (regardless of whether it is located in a first class section).

The customer can also request that an accommodation have a particular location relative to other accommodations reserved by the customer. For example, a customer can specify that additional seats reserved by a customer be located within the same aisle as a seat previously reserved by the customer.

In certain implementations, the customer can also indicate a rank of importance to associate with a submitted preference. For example, the customer can submit a rank indicating that the customer has a top preference that a train seat to be forward facing during travel and a lower preference that the train seat be located on a second deck of a train car.

In some implementations, the travel provision application 102 can be used by an employee of a travel provider for customizing travel accommodations for customers, employees, or cargo. For example, an airline employee can use the travel provision application 102 to create a schedule accommodation for a flight crew (e.g., schedule a pilot, crew, or air marshal to fly on an aircraft). In another example, a train ticket agent can use the travel provision application 102 to create a request for a cargo accommodation, such as reserving a refrigerated car for food items.

Additionally, a request for an accommodation is not limited to accommodations on travel carriers, but can include accommodations for stationary storage. For example, the request can be for a room in a hotel or for a storage space in a warehouse.

In some implementations, the properties of an accommodation are associated with pricing debits or credits that are applied to charges for the accommodation. For example, each customized configurable property can be associated with a price increase or decrease. In some implementations, the travel provision application 102 can aggregate pricing debits and credits with a particular base price of one or more of the accommodations to determine an adjusted price for each of the accommodations.

FIG. 1 is a diagram of an exemplary system 100 for configuring, customizing, and managing travel accommodations. In the example of FIG. 1, the travel provision application 102 is running on server 103. The travel provision application 102 can use generic travel objects 104 to define one or more travel accommodations. In some implementations, a generic travel object is a software object defined using a class definition of an object-oriented programming language, such as Java or C++. The travel object can represent a variety of accommodation types and have associated customizable properties. As such, generic travel objects 104 may be used to instantiate particular equipment (e.g., a train compartment, an airline seat, etc.) with various customizable properties.

In operation, the travel provision application 102 can use a generic travel object located in repository 104 to create one or more travel objects. For example, a generic travel object 104 can be used to instantiate a train seat travel object 106 or an airline seat travel object 108 that are subsequently available for passenger reservation. The instantiated objects store customized user-entered criteria related to the accommodation equipment (e.g., physical attributes of seats, rooms, etc.).

FIG. 1 shows a train seat travel object 106 and an airline seat travel object 108. The train seat travel object 106 includes various configurable properties 110 set by a user of the travel provision application 102. The configurable properties 110 may correspond to one or more pieces of equipment located in the train car 112. In this example, the configurable properties 110 of the travel object 106 represents a particular train seat, such as train seat 114.

In some implementations, the travel object's configurable properties 110 correspond to attributes besides physical properties of equipment. For instance, the configurable properties 110 can also include services offered during travel. For example, a first configurable property 116a represents a choice for where to receive meals. Here, the train seat is associated with a meal service at the train seat 114.

The illustration of the seat 114 in a train car 112 shows exemplary attributes that can be associated with a seat, such as meal services 116b, type of ceiling 118b, a group the seat with which the seat is associated 120b, a level on which the seat is located 122b, and a direction the seat is facing 124b. Each of these attributes can be represented by properties associated with a travel object 106 representing the seat 114. For example, a configurable property 118a represents the type of ceiling—transparent—associated with seat 118b. Configurable property 120a represents a group assigned to the seat. In this example, the seat is assigned to a senior citizen tour, which indicates that this seat is reserved for members of that tour.

In another example, a configurable property 122a indicates that the seat 114 is located on the second deck of the train car 112. Additionally, the example of FIG. 1 shows a configurable property 124a that corresponds to a seating direction that indicates which way the seat 114 is facing during travel of the train car 112. The train seat travel object 106 depicts a few of the configurable properties for the train car 112, but other configurable options are possible.

As implied in the description above, some of the configurable properties may stay the same for a particular accommodation and some may subsequently change. For example, the travel object 106 representing the train seat 114 can have a static configurable property that specifies that the seat 114 is located on the second level of the train car 112. This property does not change because it is a physical property of the seat 114 that is fixed. The configurable property representing the travel direction, however, may change. For example, if the train car 112 switches travel direction (e.g., on a return trip), the property can be changed to indicate that the seat is now facing backwards during travel.

Similarly, the travel object 108 can represent a different accommodation, such as an airline seat 126. Like the travel object 106 representing train seat, the travel object 108 can have various configurable properties 128 that represent attributes of the airline seat 126 as shown in FIG. 1. A first configurable property 130a represents a choice for seat location. Here, the airline seat 126 is associated with a window seat location 130b. A second configurable property 132a represents a choice for seat row. Here, the airline seat 126 is associated with an emergency row 132*b*. A third configurable property 134*a* represents a choice for seat section. Here, the airline seat 126 is associated with a coach section 134*b*. A fourth configurable property 136*a* represents a choice for service level. Here, the airline seat 126 is associated with a first class service level 136*b*. A fifth configurable property 138*a* represents a choice for a seat characteristic. Here, the airline seat 126 is associated with a 'no seat recline' seat characteristic 138*b*. A sixth configurable property 140*a* represents a choice for an ambiance characteristic. Here, the airline seat 126 is associated with a quiet ambience characteristic 140*b*

Figure 2:
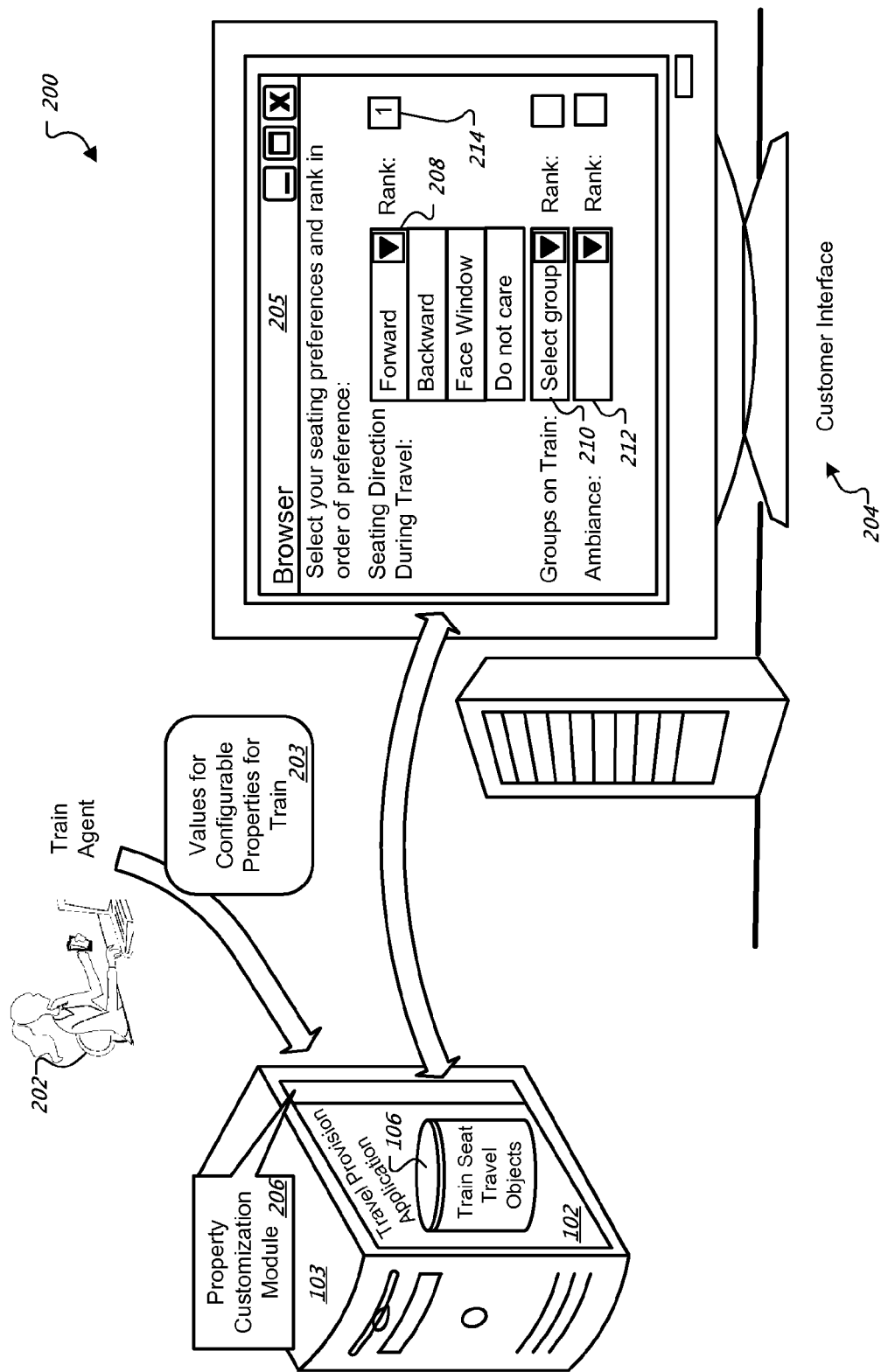
FIG. 2 is a diagram showing an example of user interactions with a configurable travel provision application.

FIG. 2 is a diagram showing example user interactions 200 with the configurable travel provision application 102. The interactions 200 can begin with a train agent 202 accessing server 103 to configure the train seat travel objects 106. The train seat travel objects 106 can have configurable properties corresponding to one or more aspects of the train seat equipment. The train agent 202 can input values 203 for configurable properties of the train seat equipment. In certain implementations, the configurable properties can include attributes that affect a passenger's travel experience. The train agent 202 can input the values at a train station before travel occurs or after one or more segments of travel has occurred.

As shown in FIG. 2, a customer also can access the travel provision application 102 through a customer interface 204. The customer interface 204 can include a web service application program interface that interacts with a web page accessible by a browser 205 (as shown), a PDA, a cell phone, or other network-enabled devices.

In general, the customer interface 204 can permit the customer to create modify, or otherwise manage travel provisions, such as airline or train reservations. In particular, the customer interface 204 can allow access to the property customization module 206 to manage the travel provisions. The property customization module 206 is configured to receive input from train agent 203 and preference criteria from customer interface 204. The train agent 203 can enter configurable properties 203 into the property customization module 206. The customer can use the interface 205 to specify preferences that affect the selection of one or more travel provisions, such as travel reservations.

The customer interface 204 can present a graphical user interface for the user to enter preferences, which are then matched with properties of accommodations in a provisioning process (e.g., during an airline seat reservation process). For example, the customer can select a "seating direction during travel" field 208 to indicate his or her seat direction preference during travel. In this example, the customer selects from a list of forward, backward, face window, or do not care options. Similarly, the customer can select other travel provision preferences, such as preferred group 210 with which to sit, an ambiance 212 associated with the accommodation, or other attributes of the accommodation, such as those described in association with FIG. 1.

In addition to selecting travel provision preferences, in certain implementations, the customer can associate a ranking 214 with each preference. The travel provision application 102 can use the ranking to determine which criterion to prefer in the selection of one or more travel provisions, which are returned to the customer. Here, the customer has ranked the "seating direction during travel" field 208 as the most important preference.

In some implementations, the ranking can indicate the user-defined importance for each preference relative to the user's other preferences. For example, a customer can rank his or her preferences such that the system determines which criterion to prefer in the selection of one or more amenities (e.g., first class service type most important, then reclining seat, etc.). In some implementations, such as when the user does not provide preference rankings, the travel provision application 102 can apply a default ranking mechanism to the user's selected preferences. For example, travel provision application 102 can be configured to weight a preference indicating that multiple seats should be reserved together over an ambience preference.

In some implementations, the travel provision application 102 can use the train agent values 203 for the configurable properties and the user-entered preferences from interface 204 to select travel provision(s) to return to the user. For example, an optimization scheme can be used to compare ranked criteria to the customized configurable attributes of travel objects. If the travel provision application 102 finds one or more accommodations that have configurable properties that match the user-submitted preferences, the application 102 can return the results to the user. The user can then select an accommodation for provisioning (e.g., the user can select a cruise cabin to reserve from a set of returned available cruise cabins).

In some implementations, the user that makes travel provision is a human customer as described above, however, the user also can be a software program that is part of or interacts with the travel provision application 102. For example, there may be a proxy server (not shown) that acts as an intermediary between a customer and the travel provision application 102. The proxy may cull a subset of the configurable properties to present to a customer during a travel reservation process. In another implementation, the travel provision application 102 may self select preferences based on a customer's profile. For example, the customer can submit a profile that lists preferences (and optionally rankings) which are later used when a passenger access the customer interface to make a reservation. In another example, the application 102 may automatically schedule crews for a carrier based on availability of crew members, government regulations, carrier routes, etc. In this latter example, the accommodations can include entire carriers, such as planes, instead of individual equipment (e.g., seats) on a carrier.

Figure 3:
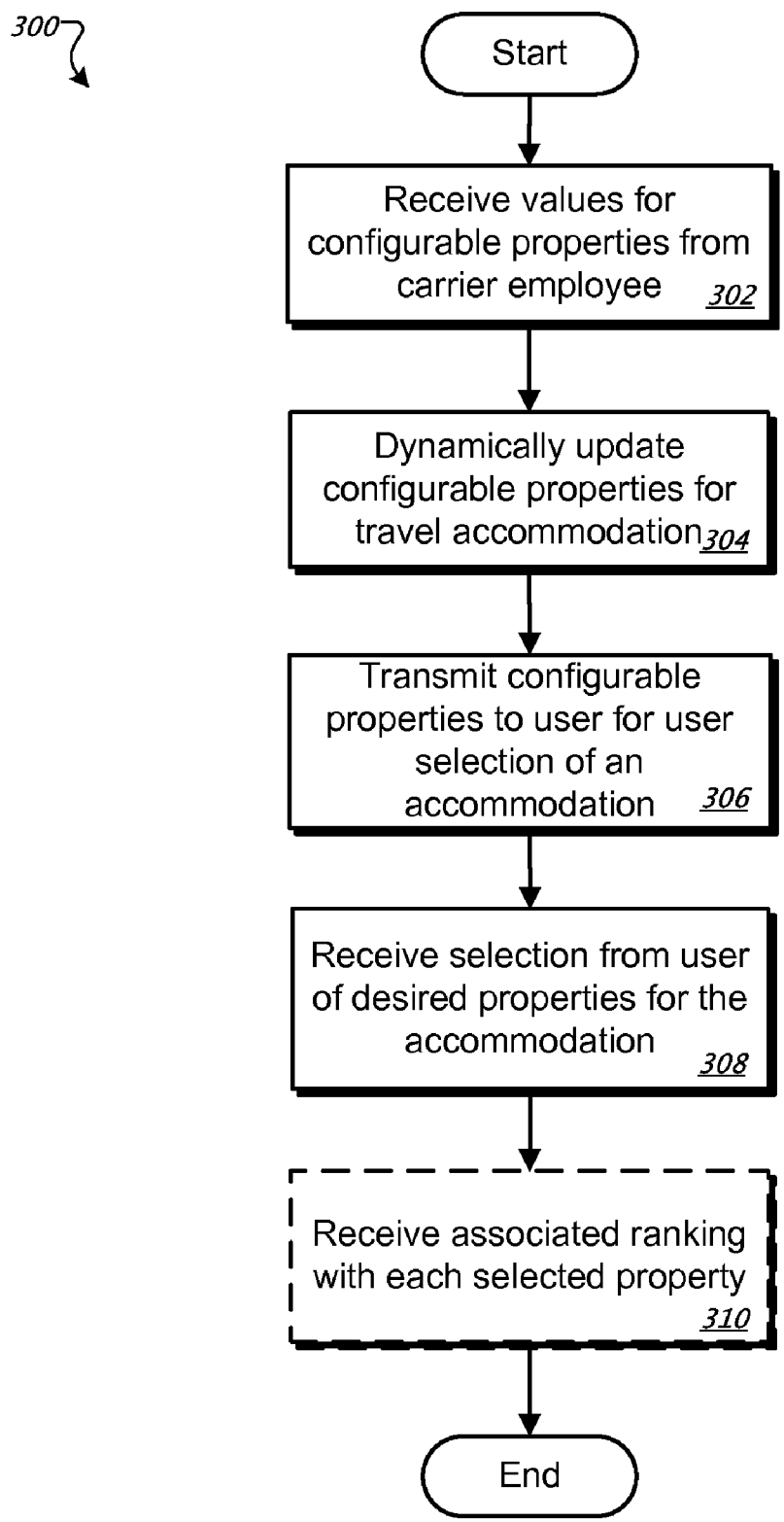
FIG. 3 is a flow chart of an example method for defining and using a software travel object.

FIG. 3 is a flow chart of an example method 300 for defining and using a software travel object. The software travel object can represent a variety of accommodation types and associated customizable properties. The method 300 may be performed by an application, such as the travel provision application 102, for example.

In step 302, the process 300 can begin by receiving values for configurable properties from a carrier employee (e.g., airline employee, train employee, warehouse employee, hotel employee etc.). The values may be, for example, configurable properties for the software travel object, which specify attributes of an accommodation (e.g. equipment) that affect a passenger's experience during travel. For example, a hotel accommodation may have attributes such as turn-down service, penthouse level, mini-bar, living room, etc.

In step 304, the configurable properties for travel accommodations are dynamically updated. In certain implementations, a ticket agent can use the property customization module 206 to dynamically update the configurable properties. For example, if a train switches direction at a station stop, the travel direction for each of the seats can be dynamically updated (with or without human intervention).

In step 306, the configurable properties can be transmitted to a user for selection of an accommodation. For example, the travel provision application 102 can transmit the configurable properties to the customer interface 204. The configurable properties can be used to generate available accommodation attributes, which are presented to a user for selection. For example, if a configurable property includes ceiling type, which can have two possible values—transparent and opaque, the customer interface can generate a user interface element In step 308, the method 300 includes receiving a selection from the user containing desired properties for the accommodation. For example, the user can request a travel provision for a forward facing seat 208 and an ambiance 212, such as "quiet," using the customer interface 204. The request can be sent to the travel provision application 102 to search for an available accommodation (e.g., a seat having the forward facing property).

Optionally, the method 300 can include receiving an associated ranking with each selected property (step 310). For example, the user can add a ranking associated with the user's selections and forward the rankings to the travel provision application 102. In some implementations, the travel provision application 102 can use the rankings in an optimization function to determine a "best fit" accommodation.

In some implementations, a proxy server performs the process 300, where the proxy server services customer requests receiving, formatting, and forwarding customer selections and rankings to other servers. For example, the customer interface 204 can connect to a proxy server (not shown) to receive an updated list of configurable properties. In this example, the travel provision application 102 may submit the configuration properties to the proxy server where they can be reformatted or used in the generation of an graphical user interface (GUI). In some implementations, the user can be another software application (as opposed to a human customer) that, for example, uses the proxy server to configure and select a particular combination of seat assignments.

Figure 4:
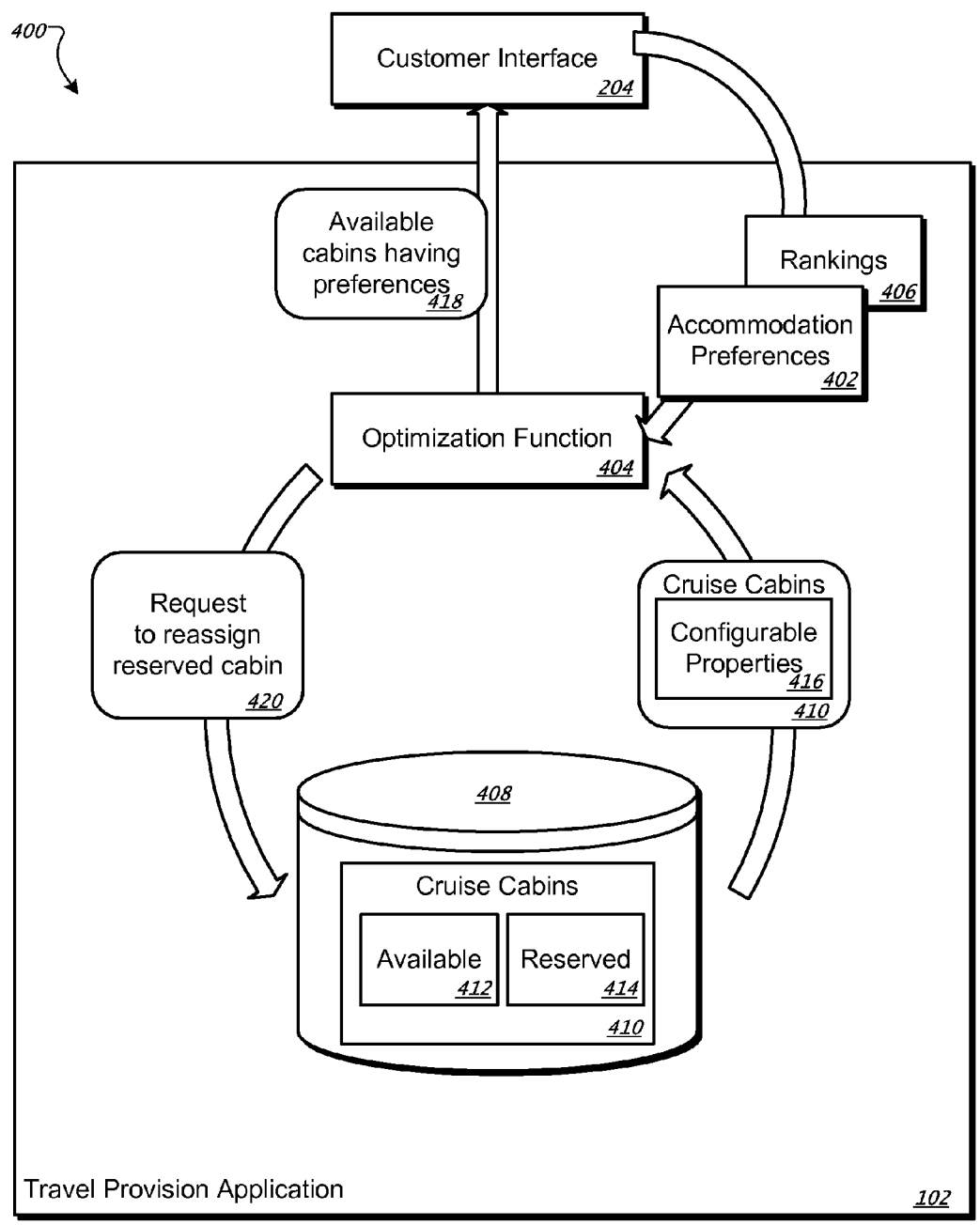
FIG. 4 is a block diagram of an example system used to allocate seating reservations.

FIG. 4 is a block diagram of an example system used to allocate seating reservations. The system illustrates the use of a seating algorithm 400 in the travel provision application 102. The seating algorithm 400 can provide a user with options (e.g., possible values for customized properties) used to select accommodations during a travel provisioning process. In some implementations, after receiving user preferences, the seating algorithm 400 uses an optimization function to compare the preferences to properties of accommodations to determine accommodations that best match the user's preferences.

In some implementations, the seating algorithm 400 generates the customer interface 204. The customer can use the customer interface 204 to send accommodation preferences 402 (and optionally, the ranking scores 406) to an optimization function 404. The optimization function 404 can produce use the preferences and weights associated with the preferences to select one or more accommodations for presentation to, for example, a customer reserving airline seats. In some implementations, the ranking scores are used in the calculation of the weights associated with the preferences. In other implementations, the weights associated with particular properties are predetermined.

In an example, the customer can use interface 204 to send accommodation preferences for a cruise voyage. The preferences may include a number of passengers, a price, a service type, a destination, a date of travel, a length of travel, a deck level, an ambience for the accommodation, or other conditions influencing the customer during travel.

After receiving accommodation preferences 402, the optimization function can use the preferences to determine what accommodation(s) best match the preferences. For example, the optimization function 404 can query the data store 408 to receive information on one or more travel objects in data store 408. In this example, data store 408 includes a cruise cabin travel objects. Each cruise cabin travel object 410 is a software representation of a cruise ship cabin for a particular cruise ship. Cruise cabin travel objects can be available 412 or previously reserved 414. If a cruise cabin travel object is available, the accommodation it represents can be selected for reservation. If a cruise cabin travel object is reserved, it has been previously reserved by, for example, another customer. The cruise cabin travel objects have properties 416 that are compared with the user-submitted preferences to determine which cruise cabins best match the user's preferences.

The optimization function 404 generally attempts to find a suitable accommodation for customer entered preferences 402 by comparing the preferences 402 with properties of the cruise cabins 410. In some implementations, the optimization function can determine which travel object has the most properties that match the user's preferences. The customer interface can then present information to a customer identifying accommodations associated with the matching travel objects 418 so that the customer can select an accommodation to reserve.

In some implementations, the optimization function accounts for weights associated with the preferences or other information received from the user. For example, if a particular passenger has more than one segment of travel, the optimization function 404 can favor the selection of an accommodation further from a carrier's egress (e.g., toward the back of an airplane) so that passengers with only one segment are placed closer to the exit (so that they can exit quickly). In another example, if a customer requests a handicap accessible room, the travel provision application 102 can—by default—weight the accessibility preference higher than any other submitted preference to ensure the room is indeed handicap accessible.

In some implementations, the optimization function may first attempt to find an accommodation "match" from the set of available travel objects 412. If a satisfactory match is not found, the function also can examine previously reserved travel objects 414 to determine if a match can be found. If a match is found in the previously reserved travel objects, the match can be presented to the user for reservation if the travel provisioning application 102 can re-assign the customer who previously had reserved the accommodation to another accommodation that satisfies the customer's preferences. For example, if a first customer's only submitted preference is that a cruise cabin have a window, the travel provision application 102 can re-assign the first customer to another cruise cabin that has a window, thereby freeing up the previously reserved cabin for presentation to a new customer for possible reservation.

In some instances, neither an available accommodation nor a reserved accommodation may satisfy a user's preferences. In this case, the optimization function 404 can, in some implementations, remove or re-rank one or more preferences submitted in a request 420 for a travel provision. For example, a customer request may include six preferences: window room, Victorian themed room, top deck, 9-day cruise, destination Bahamas, and early evening flight on Saturday. If an exact accommodation cannot be found, the optimization function can determine the closest match based on fewer requested options. For example, the optimization function 404 discount or eliminate the preference "9-day cruise," if a matching accommodation is not available.

In certain implementations, the optimization function 404 can re-rank the requested options to find a suitable accommodation. For example, if a user specifies that the preference "top deck" has a ranking of "1," indicating that the preference is most important, the function 404 may re-rank the preference to "2," and raise, for example, the preference "Bahamas" to "1." The re-ranked preferences can indicate that the optimization function now selects an accommodation on a lower deck associated with a Bahamas cruise over an accommodation on the top deck associated with a non-Bahamas cruise.

Figure 5:
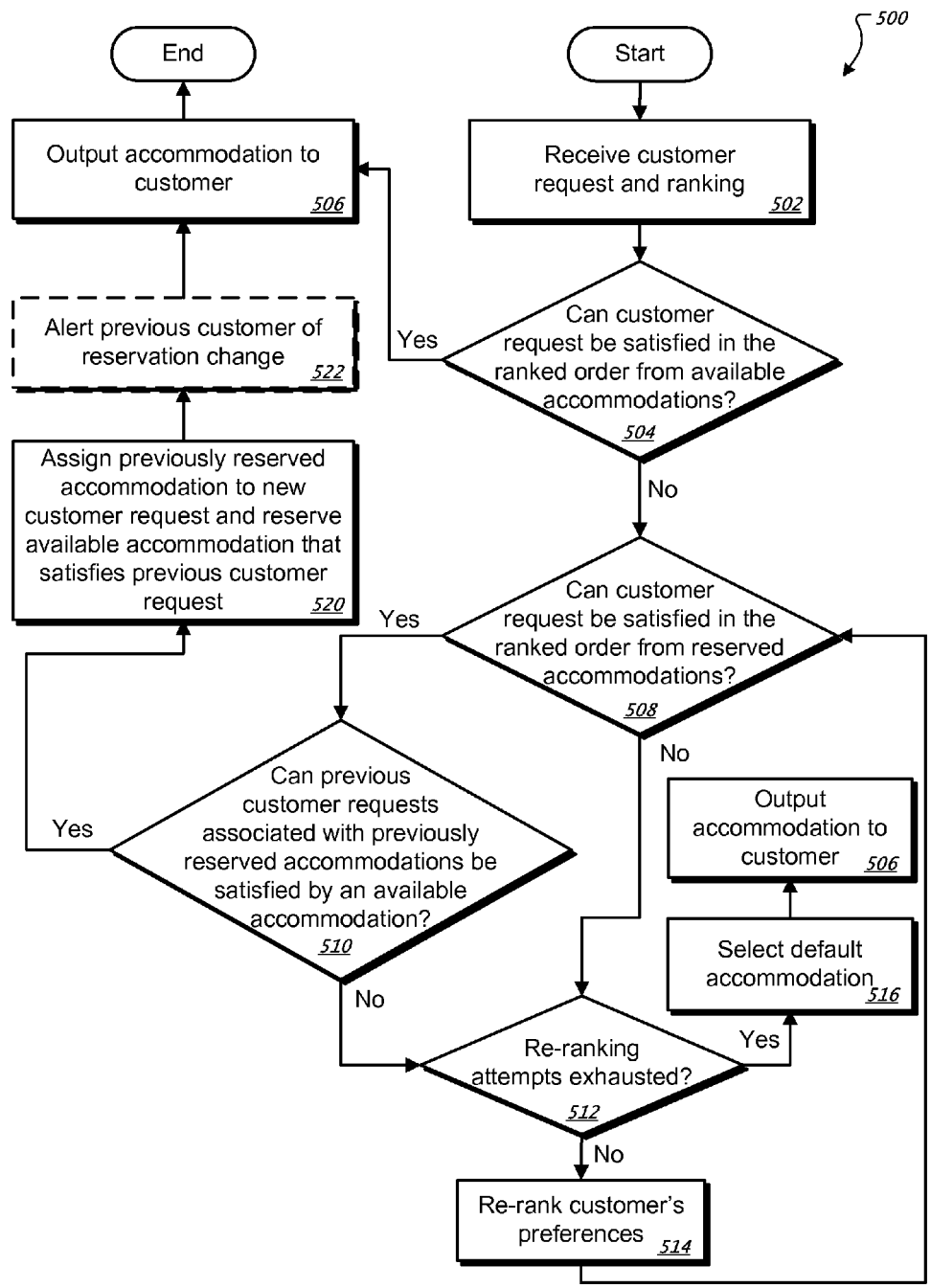
FIG. 5 is a flow chart of an example method for selecting accommodations during a travel reservation.

FIG. 5 is a flow chart of an example method 500 for selecting accommodations during a travel reservation. At step 502, the method 500 receives a customer request for a travel reservation and a ranking of preferences. The customer can specify preferences that affect the customer's experience during travel. For example, the customer may wish to reserve space in a warehouse and specifies a preference that the space must be refrigerated. In another example, the customer can request airline seats that satisfy the following preferences: two seats next to each other, coach section, and champagne service while in flight. In this example, the order listed is the customer's preferred ranking order of importance. The request and ranking can be sent to the optimization function 404, for analysis.

At step 504, it is determined whether the customer request can be satisfied in the ranked order from the available accommodations. If an accommodation is available that meets all the preferences, the optimization function 404 can output the available accommodation information to the customer, in step 506. In some implementations, the customer then can review the accommodation and book a reservation through the customer interface 204.

If the customer request cannot be satisfied by an available accommodation, in step 508, it is determined whether the customer request can be satisfied in the ranked order from the reserved accommodations. For example, the optimization function 404 can determine whether one or more reserved accommodations matches the customer request. In particular, the optimization function 404 can compare the ranked criteria to the customized, configurable properties of one or more reserved software travel objects. If the optimization function 404 determines that a reserved accommodation can satisfy the customer request, it is determined, in step 510, whether the previous customer requests associated with the previously reserved accommodations can be satisfied by an available accommodation.

If it is determined that the previously customer request cannot be satisfied from the available accommodations, a re-ranking of the submitted preferences can be attempted. In step 512, if the re-ranking attempts have not been exhausted (e.g., based on a predetermined threshold), the optimization function 404 can re-rank the customer's preferences, in step 514, and return to step 508 to re-query the available—and possibly the reserved—accommodations.

If, however, in step 312, the re-ranking attempts have been exhausted, the optimization function 404 can select a default accommodation, in step 516. The default accommodation information can be outputted to the customer for review, in step 518. For example, the optimization function 404 can ignore the preferences and pick an available cruise.

If the optimization function 404 determines (in step 510) that a previously reserved accommodation can be re-assigned, the function 404 can re-assign, in step 520, the previously reserved accommodation to the new customer and reserve for the previous customer an available accommodation that satisfies the previous customer's preferences. In some implementations, requirements for reassigning accommodations previously reserved for a customer include keeping the newly assigned accommodations together. For example, if a previous customer reserved three airline seats together, any reassignment of seats would require that the seats be together.

After assigning a previously reserved accommodation to a new customer, the method 500 can optionally alert the previous customer of the reservation changes, in step 522. For example, the travel provision application 102 can send an email, a text message, or a phone call to notify the customer about the modification. In some implementations, an upgrade can be applied to the previous customer's reservation. For example, a free drink, room upgrade, flight upgrade, or other amenities can be added to the customer's reservation.

The optimization function 404 can output selected accommodation(s) to the new customer, in step 506. The output can include one or more available accommodations resulting from the determination (by optimization function 404) for use in the customer selection of a travel accommodation. In some implementations, the previous customer can be given an option to reject a change in his or her reserved accommodations before the accommodations are made available for selection to the new customer. In some implementations, the previously reserved accommodation may have been reserved as a "flexible" accommodations indicating that a reservation that met the preferences was assigned but not indicating an assignment of a specific room, seat, etc. In this case, the previous customer may not be notified of a modification to a reserved accommodation because any change would not be apparent to the customer.

Figure 6:
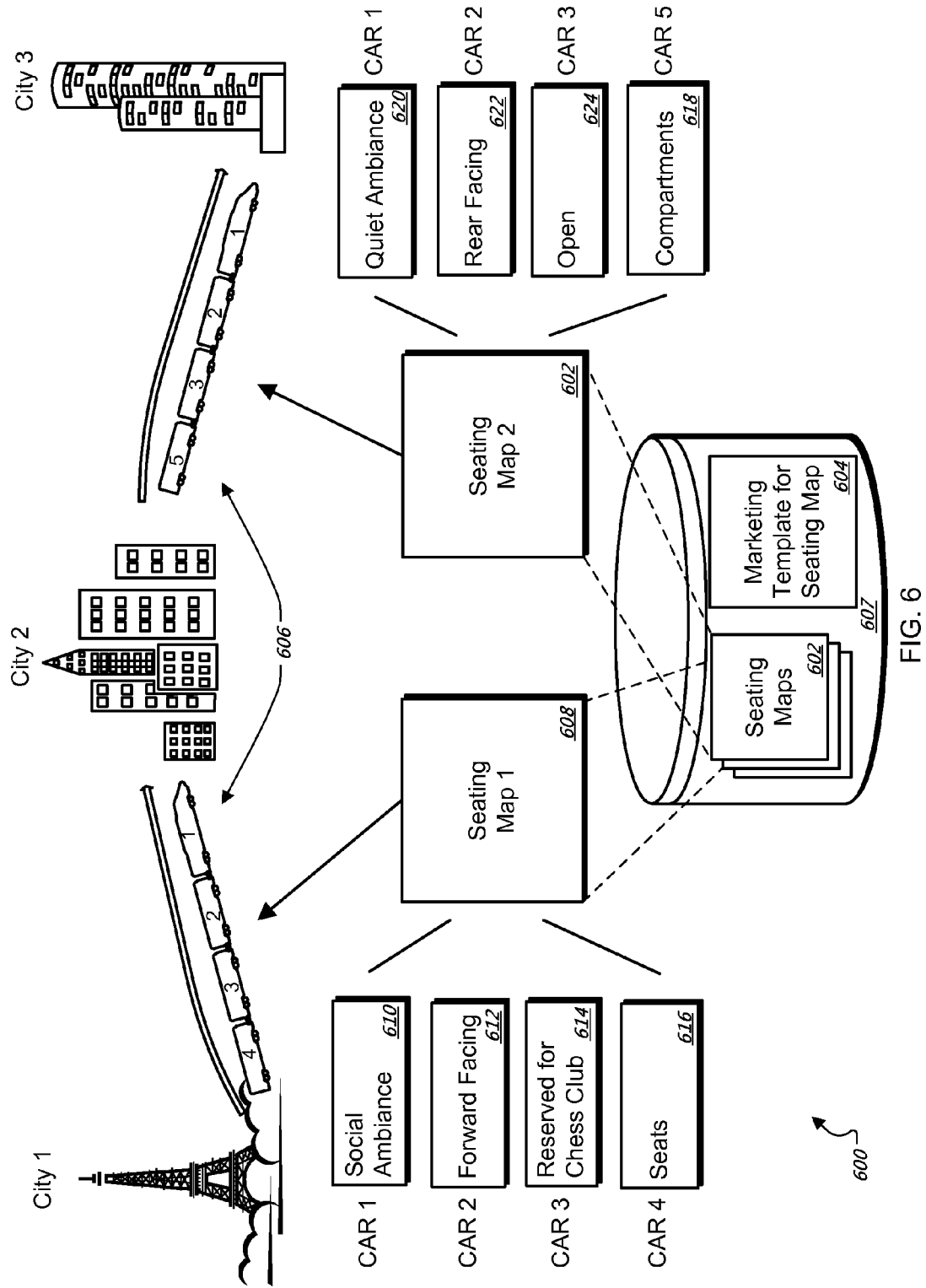
FIG. 6 is a block diagram of an example system for mapping seat assignments.

FIG. 6 is a block diagram of an example system 600 for mapping seat assignments. The system 600 indicates, for example, how to create seat maps 602 and marketing templates 604 for a train 606. The seat maps 602 and marketing templates 604 can be stored in a data store 607 in system 600. The seat maps 604 can represent the physical equipment layout (e.g., individual seat layout) of the train car. For example, the seat map 604 can include layout information physical properties of the accommodations, such as seat orientation and numbering. The marketing templates 604 represent one or more "marketing" properties (e.g., seat ambiance) associated with the equipment. In some implementations, the marketing properties are not tied to the particular seat and may be changed dynamically. For instance, marketing templates 604 can be used to logically group seats and cars for marketing purposes. In one example, the marketing template can be used to assign a "quiet ambience" property to a group of seats. Customers can then select these seats if they wish to have a quiet environment during travel.

In the example of FIG. 6, seat maps and marketing templates are applied to accommodations on train 606. In some implementations, the maps and templates are implemented using the travel provision software, which is used by a train employee, administrator, or ticket agent to define properties associated with the train seats.

In operation, a train employee using the travel provision software can create and/or modify seat map configurations and marketing configurations for one or more trains. New seat maps and marketing configurations may be requested by customers and/or ticketing agents that differ slightly from existing seat maps and marketing configurations. As such, the train employee or administrator can copy an existing seat map and/or marketing configuration to create a new seat map or marketing configuration.

FIG. 6 depicts a train 606 traveling in a first direction from City 1 to City 2 and then to City 3. Upon reaching City 3, the train can return to either City 2 or City 1, but may change either marketing templates or seating maps based on several possible occurrences. For example, a train may change train cars, which correspondingly requires a change in seat maps if the cars are physically different. In another example, the marketing properties may change for each leg of the trip. For example, car 1 can be associated with a social ambience traveling from City 1 to City 2, but have a quiet ambience from City 2 to City 3.

In some implementations, a seating map or marketing template can be applied to an entire carrier, on a per car basis (e.g., per train car), per or seat basis. In one example, the travel provision application can create, modify, or replace the marketing templates on a per car basis, where individual properties are assigned to each seat in a car. For example, a seat located on an upper deck with a conference room may have a particular properties associated with a marketing template for the train car in which the seat resides.

In the depicted example of FIG. 6, various marketing templates 604 have been applied to each car. For example, the CAR 1 train car is mapped as a social ambience car 610, where the ambiance is considered "social." The CAR 2 train car is mapped as a forward facing car 612 where all seats face forward during travel. The CAR 3 train car is mapped as a reserved chess club car 614 and may be available for reservation by chess club members. The CAR 4 is mapped as a seat car 616 indicating that the car's equipment consists of seats (as opposed to train compartments, for example).

The same train traveling from City 2 to City 3 can be mapped with different marketing templates that were dynamically updated after travel between City 1 and City 2 was completed. In this example, the seat map 602 is used for the train 606. The seat map 602 can include different properties for the train seats than the seat map 608. For example, at City 2 the CAR 4 train car 616 is replaced with a CAR 5 train car 618, which has different physical equipment (i.e., train compartments) than the CAR 4 train car. The seat map 602 reflects this change by indicating that CAR 5 has compartments.

Other changes in the seat map 602 include mapping the CAR 1 train car as a quiet ambiance car 620 instead of having a social ambiance. Also, the CAR 2 train car is now mapped as a rear facing car 622, and the. CAR 3 train car is now mapped as an open car 624, which is available for general seating.

Figure 7:
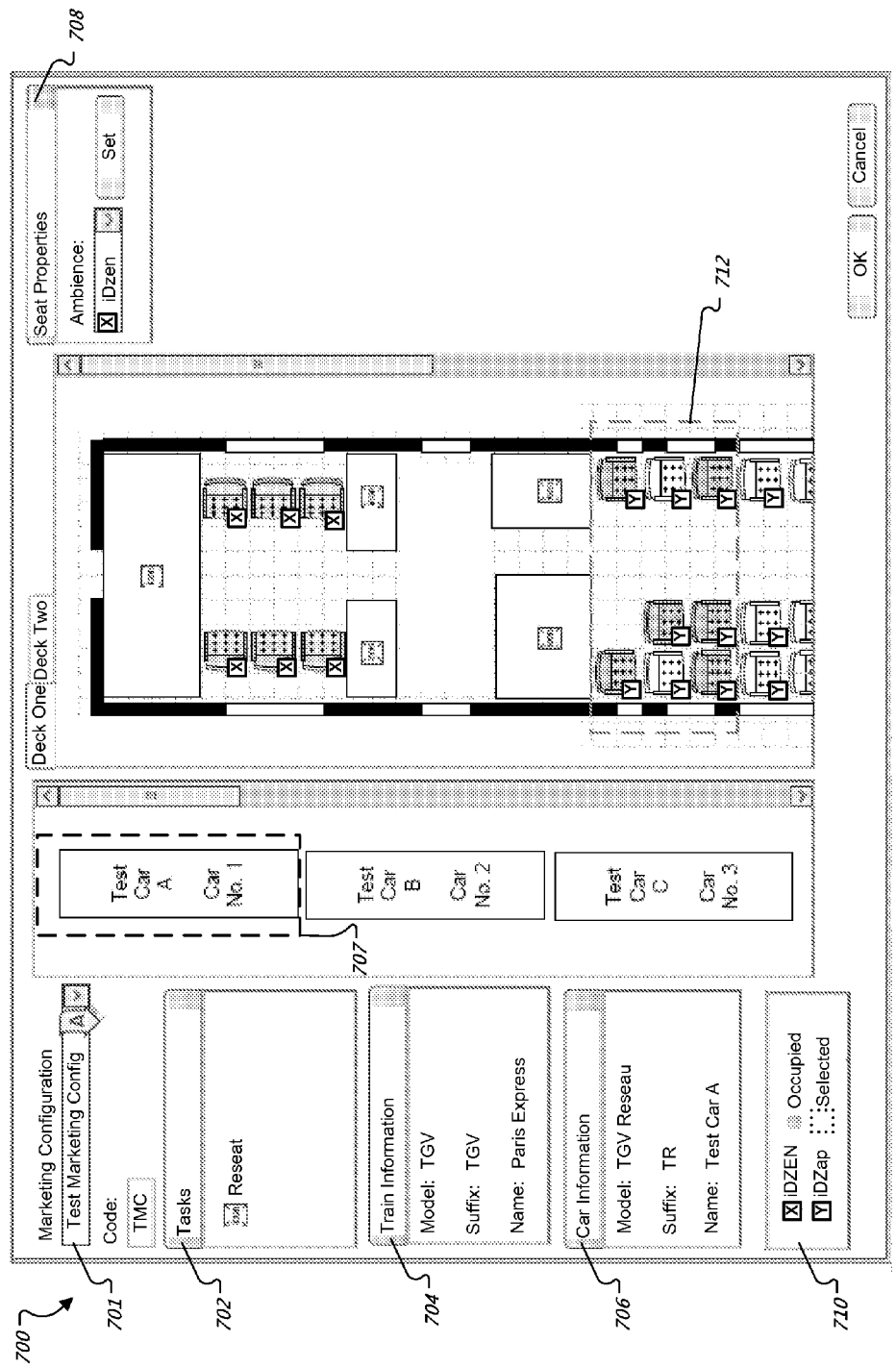
FIG. 7 is a screen shot showing an example application for editing marketing configuration properties.

FIG. 7 is a screen shot showing an example interface application 700 for editing marketing configuration properties. Marketing configuration properties may change frequently during a booking process based on demand for seats, for example. In some implementations, marketing properties can be modified to optimize revenue and enhance customer experience by catering to customer travel preferences and requirements.

As shown in FIG. 7, a particular marketing property configuration can be modified by selecting the configuration from dropdown 701 in application 700. The dropdown 701 can list one or more selectable marketing configurations. A different marketing configuration can be selected and applied, for example, to each train or train car. The application also can display information related to outstanding tasks 702, train information 704, car information 706, and seat properties 708.

As shown in FIG. 7, the user has selected deck one of Test Car A 707. In the depicted example tabs are used to switch between the decks of a train car when a car has more than one deck. The user of application 700 can choose an ambiance level in seat properties 708. To select a section of seats for modification, the user can click and drag a cursor over a group of seats. Once the seats are selected, the marketing properties can be changed for the selected seats. Here, the user has selected "iDzen ambience" which indicates an area for customers that prefer a quiet atmosphere and want to sit with others that prefer the same. The "iDzen ambience" seats are noted in application 700 by an "X" shown on the seat icon. One or more icons can be added to any or all seats to indicate other marketing properties may apply.

The screen shot 700 also depicts a legend 710 for distinguishing marketing properties on one or more seats. For example, the legend 701 distinguishes seats having an X with quiet ambience and seats having a Y with social ambiance. Similarly, selected seats 710 have a dashed line around them to indicate changes made will be applied to selected seats. As such, users of application 700 can generally select a portion of seats for applying marketing properties (i.e., several seats can be modified at one time). Here, the user has selected seats 712 for modification.

Figure 8:
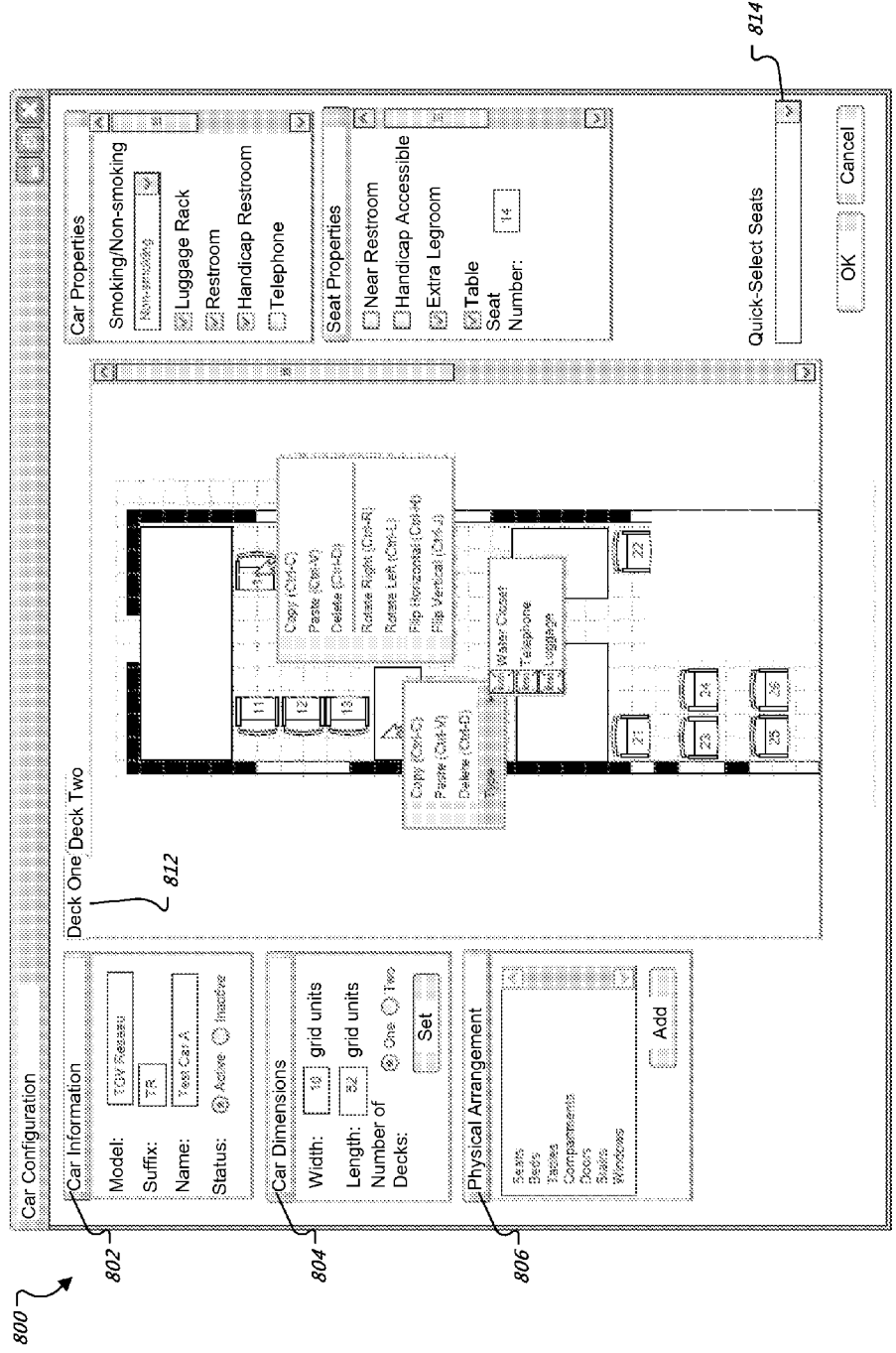
FIG. 8 is a screen shot showing an example application for configuring seating accommodations.

FIG. 8 is a screen shot showing another example interface application 800 for configuring seating accommodations. The application 800 can be used to modify the map of a carrier, such as a train car. The map can be modified by changing fields, such as car information 802, car dimensions 804, physical arrangements 806, car properties 808, and seat properties 810. For example, a user can select the car information section 802 to modify identifiers for the car, such as a model name to associate with the train car. The user can also select car dimensions field 804 to modify car dimensions. For example, car dimensions can relate to a width and a length as well as the number of decks.

The user can also modify the physical arrangement 806 of equipment on the train. For example, the user can add seats, beds, tables, compartments, doors, stairs, windows, or other equipment to one or more train cars. The user also can modify the car properties 808 for a train car. The properties 808 can include attributes, such as whether the car includes a luggage rack, has a handicap lavatory, or has a telephone. The user also can modify seat properties 810. In this example, a selected seat (i.e., seat number 14) is associated with the seat properties: extra legroom and a table. In some implementations, seat properties have an associated icon or color to identify which seats have which properties. In some implementations, the user can select a tab 812 corresponding to a deck of the car, and can select quick-select seat dropdown 814 to select a particular seat.

In some implementations, the seat properties can be copied and pasted from a first seat to a second seat (or to a group of seats). The seat properties or the representations of the seats themselves can also be deleted or modified (e.g., a seat can be replaced with another piece of equipment, such as a lavatory).

Figure 9:
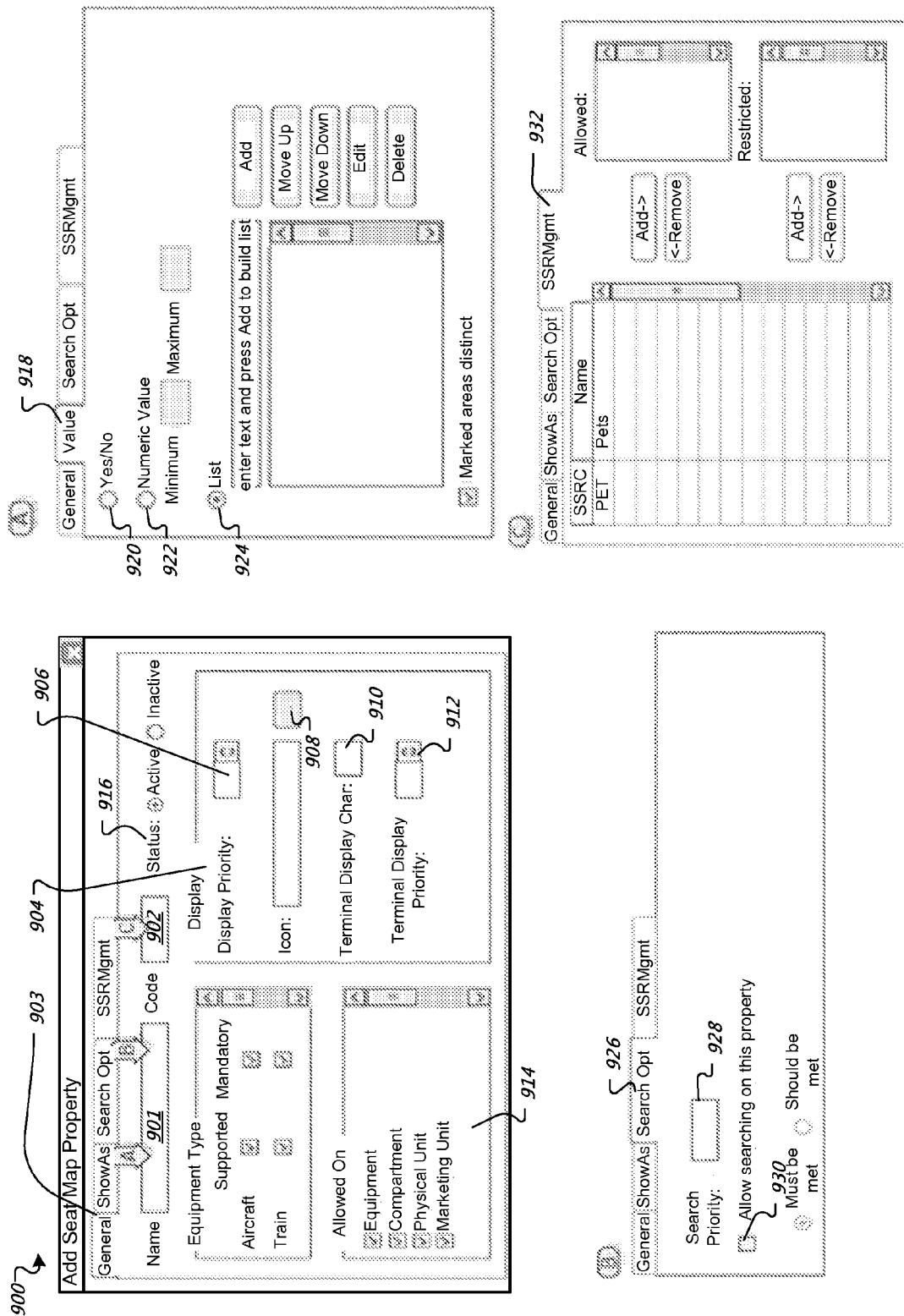
FIG. 9 shows screen shots of an example application for modifying seating map properties.

FIG. 9 shows screen shots of another example interface application 900 for modifying configurable seat map properties. A user can input a seat map property name in the name field 901 and a seat map code in the code filed 902. As shown, a user can select which equipment types can be associated with the property, as shown in the "Equipment Type" field. In this example, the new property can be associated with both aircraft equipment and train equipment.

The application 900 also includes a display field 904. The display field includes a display priority interface element 906 that can be used to set the priority for displaying icons on a selected seat map for one or more seat map properties. The display field 904 also includes a file selector 908 for choosing an icon file to represent the property. In addition, the user can select a terminal display character using a control 910 and a terminal display priority using a control 912.

The application 900 also includes a list of logical items that can be associated with the seat map property. Exemplary items are shown in an "Allowed On" section 914. Here, the user can determine which logical items can be associated with the property. In this example, the allowable list includes equipment, compartments, physical units, and marketing units. The user can also choose to set the status of the seat map properties as active or inactive using a status control 916.

FIG. 9 also shows interface elements displayed in association with a value tab 918. In this example, the elements are used to configure values possible for the property. For example, the radio button 920 can be used to indicate whether the property is associated with a particular value. The radio button 922 can indicate whether the value is numeric, and the radio button 924 can be selected if the property should include a list of possible values. The list can be entered by a user in the text box associated with the list radio button.

FIG. 9 also shows interface elements displayed in association with a Search options tab 926. The search options tab 926 includes a search priority field 928. In certain implementations, this value corresponds to or influences the weights used to select accommodations as described above. For example, the search priority field 928 can set a priority for the selected seat map property when searching for seats in application 102. The user may also choose to allow searching on this property by selecting the allow searching checkbox 930.

FIG. 9 also shows interface elements displayed in association with a Management tab 932. The management tab 932 can be used to set or remove restrictions associated with the property.

Figure 10:
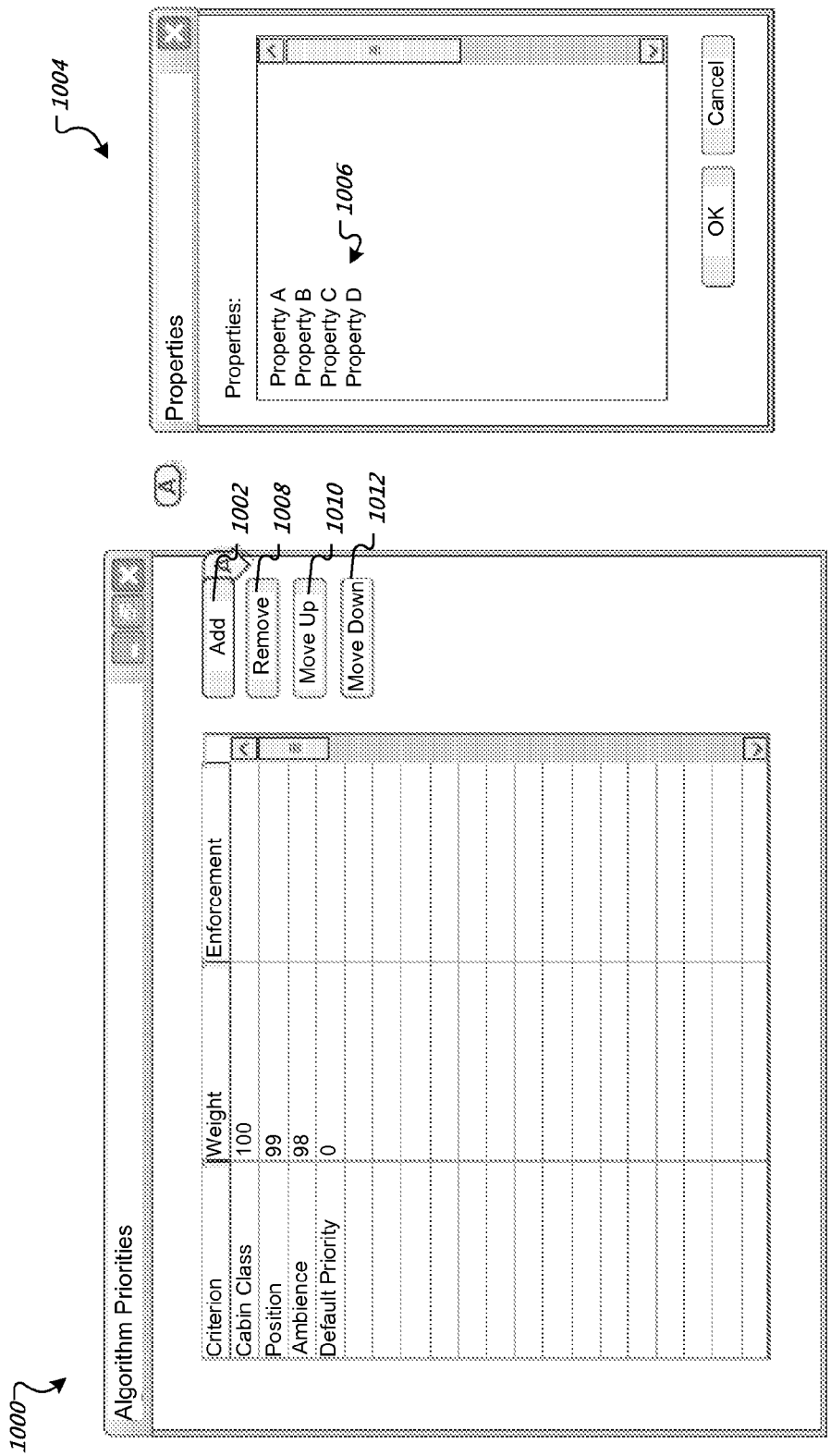
FIG. 10 shows screen shots of an example application for assigning weighting factors to seating accommodations.

FIG. 10 shows screen shots of an example interface application 1000 for assigning weighting factors to seating accommodations. Weighting factors can be used in the selection of accommodations, as discussed previously. The application 1000 can manipulate weights associated with each of the properties. As shown, the properties are arranged with the most heavily weighted properties appearing closer to the top of the list. The properties are also, in this example, associated with a weight that corresponds to their position in the list. For example, the top listed property is "Cabin Class," which is associated with a weight of "100." The next listed property is "Position," and is associated with a lower weight of "99."

In this example, the interface permits a user to modify the position (and thus the weight) of each property (e.g., using "Move Up" button 1010 and "Move Down" button 1012), remove properties (e.g., using "Remove" button 1008), or add properties (e.g., using "Add" button 1002). When adding properties, a user can select the new properties from a list 1006 included in a new window 1004 generated when, for example, the "Add . . . " button 1002 is selected.

Figure 11:
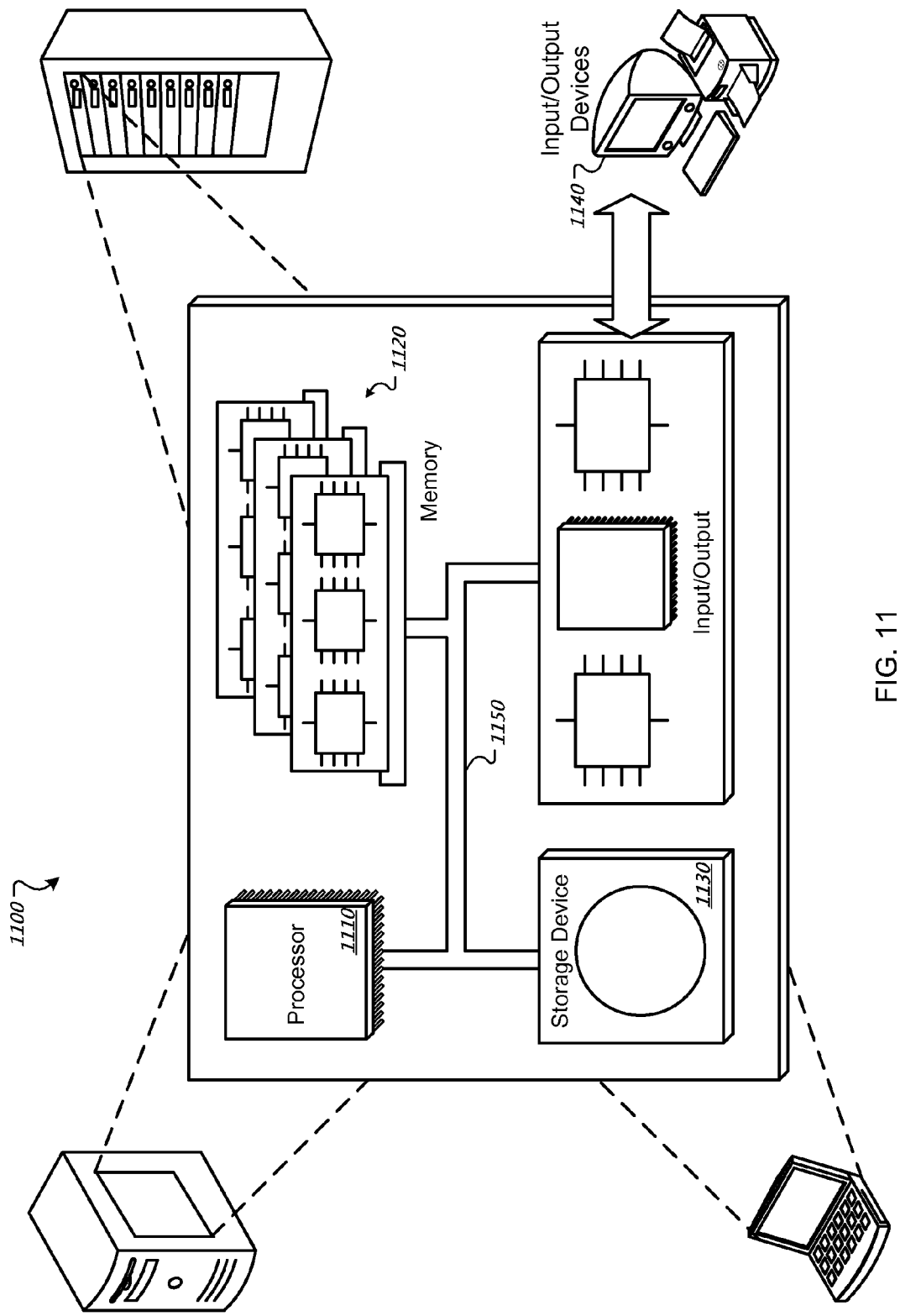
FIG. 11 is a schematic of a general computing system.

FIG. 11 is a schematic diagram of a computer system 1100. The system 1100 can be used for the operations described in association with any of the computer-implement methods described previously, according to one implementation. The system 1100 is intended to include various forms of digital computers, such as laptops, desktops, workstations, personal digital assistants, servers, blade servers, mainframes, and other appropriate computers. The system 1100 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 1100 includes a processor 1110, a memory 1120, a storage device 1130, and an input/output device 1140. Each of the components 1110, 1120, 1130, and 1140 are interconnected using a system bus 1150. The processor 1110 is capable of processing instructions for execution within the system 1100. The processor may be designed using any of a number of architectures. For example, the processor 1110 may be a CISC (Complex Instruction Set Computers) processor, a RISC (Reduced Instruction Set Computer) processor, or a MISC (Minimal Instruction Set Computer) processor.

In one implementation, the processor 1110 is a single-threaded processor. In another implementation, the processor 1110 is a multi-threaded processor. The processor 1110 is capable of processing instructions stored in the memory 1120 or on the storage device 1130 to display graphical information for a user interface on the input/output device 1140.

The memory 1120 stores information within the system 1100. In one implementation, the memory 1120 is a computer-readable medium. In one implementation, the memory 1120 is a volatile memory unit. In another implementation, the memory 1120 is a non-volatile memory unit.

The storage device 1130 is capable of providing mass storage for the system 1100. In one implementation, the storage device 1130 is a computer-readable medium. In various different implementations, the storage device 1130 may be a floppy disk device, a hard disk device, an optical disk device, or a tape device.

The input/output device 1140 provides input/output operations for the system 1100. In one implementation, the input/output device 1140 includes a keyboard and/or pointing device. In another implementation, the input/output device 1140 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

Figure 12:
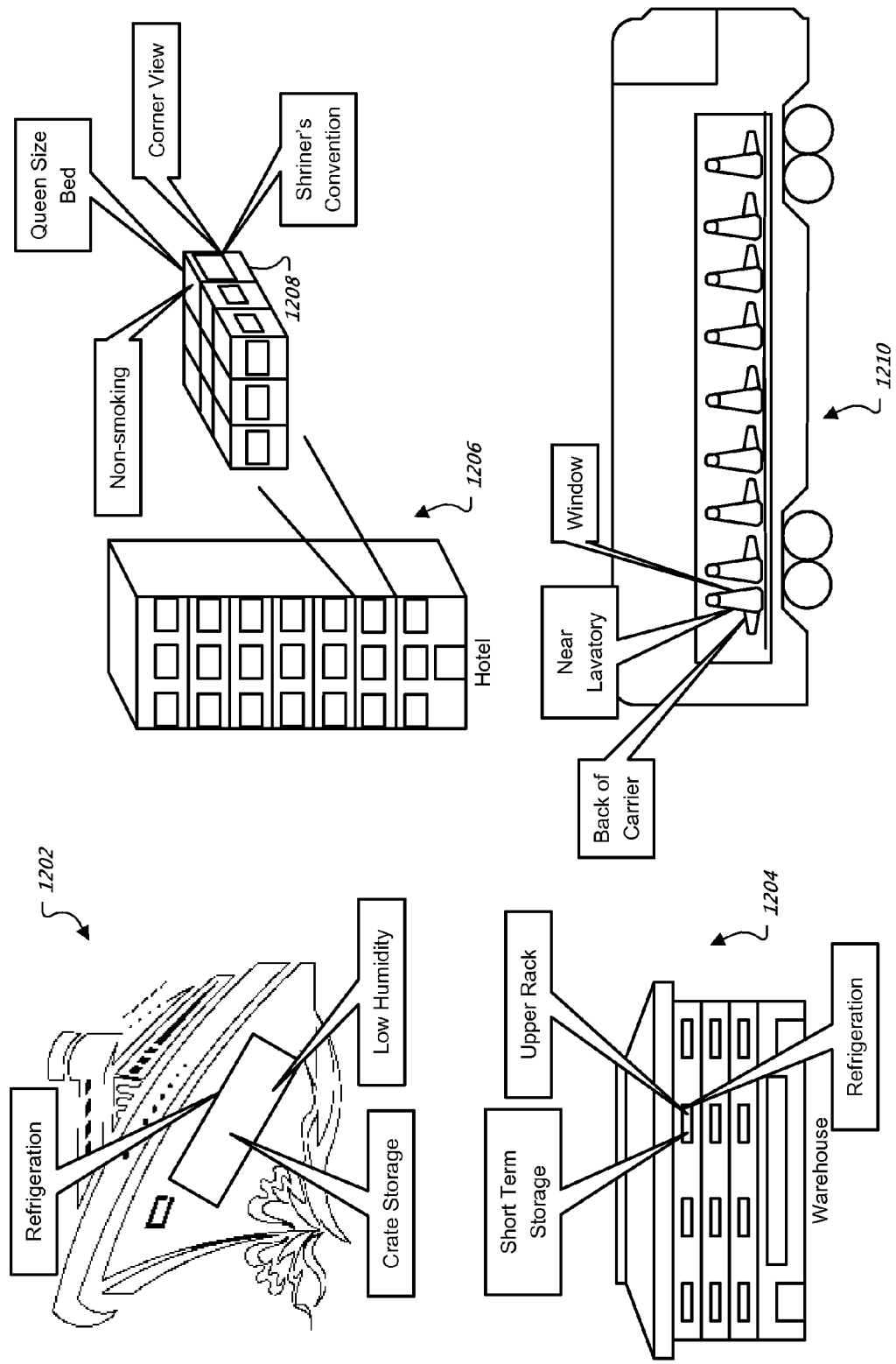
FIG. 12 is a block diagram showing alternative implementations for managing accommodations.

Although a few implementations have been described in detail above, other modifications are possible. For example, FIG. 12 is a block diagram showing alternative implementations for managing accommodations. In some implementations, a travel provision application can provide management of storage on a ship 1202. For example, a user can use the travel provision application 102 to reserve crate storage, refrigeration storage, and low humidity storage as shown on ship 1202. In some implementations, the user can input various accommodation preferences and rank them according to importance. The travel provision application 102 can send an optimized accommodation suggestion based on the input.

In some implementations, the travel provision application can provide reservations for warehouse storage 1204. In this example, a user may select preferences according to storage length, supported weight loads, environment, size of storage, or other attributes. As shown in warehouse 1204, an available storage space can include properties, such as short term storage, upper rack, and refrigeration attributes.

In some implementations, the travel provision application can provide reservations for hotel rooms. For example, space in a hotel 1206 can be reserved by one or more users of the application 102. In this example, one portion 1208 of the hotel is shown to include hotel attributes such as non-smoking, queen sized beds, corner views, and reserved for attendees of a Shriner's convention. A user looking for this particular hotel room may enter preferences in the application 102 to receive accommodations that best match his or her preferences.

In some implementations, the travel provision application can reserve accommodations on a bus 1210. For example, bus seats can include attributes such as a location at the back of the bus, a seat with a nearby lavatory, or a window seat. A user's preferences can be compared to the properties to determine at best match as described previously.

In some implementations, the travel provision application can manage accommodations for the ship 1202, the warehouse 1204, the hotel 1206, and the bus 1210. In this implementation, a customer can make reservations for several modes of transportation and/or storage using one application.

Additionally, in some implementations, the processes 300 and 500 may be performed, for example, by a system such as the systems 103, 200, or 1200 and, for clarity of presentation, however, another system, or combination of systems, may be used to perform the processes 300 and 500.

In other implementations, the travel provision application 102 can automatically provide an upgrade to the user for a next segment of travel to offset, for example, the inconvenience of a delay. For instance, the travel provision application 102 can automatically detect that a delay has occurred and can upgrade or otherwise modify a customer's travel itinerary, accordingly. In some cases, the upgrade can occur automatically without receiving customer or employee input. For example, the travel provision application 102 can upgrade a passenger with a higher grade of service, for example, and notify the customer about the upgrade. The notification may be sent if, for example, the customer's original reservation was used to fulfill a second customer's travel reservation. The application 102 can then notify the passenger of the upgrade by sending an email, text message, or a phone call, for example. In a similar fashion, the travel provision application 102 may lower a seat price for a particular customer. For example, if a particular seat is located near the entrance of a lavatory, the application 102 can offer the seat for a lower price point.

In yet other implementations, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method for providing customized attributes relating to a passenger's experience during travel that can be used to select accommodations when making travel reservations, the method comprising:

defining, by one or more computers, software travel objects, wherein the software travel objects are configurable to represent a variety of types of accommodations used in transportation of passengers;

associating one or more of the software travel objects with configurable properties, wherein the configurable properties specify attributes of the accommodations, wherein one or more of the configurable properties comprises a dynamic configurable property whose attributes are travel segment-dependent, wherein associating the software travel objects with configurable properties further comprises:

associating a particular software travel object with a 'seat facing direction during travel' property, wherein the 'seat facing direction during travel' property specifies that, during the particular travel segment, the particular software travel object has a front facing attribute and, during a different travel segment, the particular software travel object has a rear facing attribute, wherein the front facing attribute indicates that an accommodation associated with the particular software travel object is facing forward during travel, and wherein the rear facing attribute indicates that the same accommodation associated with the particular software travel object is facing backward during travel;

receiving, through a user interface, information specifying an attribute for a particular travel segment, from among the travel segment-dependent attributes associated with the dynamic configurable property, to customize the dynamic configurable property for the particular travel segment, during run-time of a software application that manages travel reservations for the accommodations;

outputting the customized configurable properties for use by a user in a selection of one or more of the accommodations during a travel reservation;

determining that the particular travel segment has been completed; and based on determining that the particular travel segment has been completed, dynamically changing the attribute for the dynamic configurable property, from the attribute specified for the particular travel segment, to a different travel segment-dependent attribute associated with the dynamic configurable property.

2. The method of claim 1, wherein associating the software travel objects with configurable properties further comprises:

associating a particular software travel object with a level of service property, wherein the level of service property specifies that, during the particular travel segment, the particular software travel object has a first level of service attribute and, during a different travel segment, the particular software travel object has a different, second level of service attribute.

3. The method of claim 1, wherein associating the software travel objects with configurable properties comprises:

associating a particular software travel object with an ambience property, wherein the ambience property specifies that, during the particular travel segment, the particular software travel object has a social ambience attribute and, during a different travel segment, the particular software travel object has a quiet ambience attribute, wherein the social ambience attribute indicates that an accommodation associated with the particular software travel object is located in an area designated for passengers who wish to talk to each other, and wherein the quiet ambience attribute indicates that the same accommodation associated with the particular software travel object is located in an area designated for passengers who do not wish to talk to each other.

4. The method of claim 1, wherein associating the software travel objects with configurable properties further comprises:

associating a particular software travel object with a group designation property, wherein the group designation property specifies that, during the particular travel segment, the particular software travel object has an 'assigned to group' attribute and, during a different travel segment, the particular software travel object has a 'not assigned to group' attribute, wherein the 'assigned to group' attribute indicates that an accommodation associated with the particular software travel object is located in an area reserved for members of a designated group, and wherein the 'not assigned to group' attribute indicates that the same accommodation associated with the particular software travel object is not located in an area reserved for members of any designated group.

5. A system for providing customized attributes relating to a passenger's experience during travel that can be used to select accommodations when making travel reservations, the system comprising:

one or more computers; and a computer-readable medium coupled to the one or more computers having instructions stored thereon which, when executed by the one or more computers, cause the one or more computers to perform operations comprising:

defining, by one or more computers, software travel objects, wherein the software travel objects are configurable to represent a variety of types of accommodations used in transportation of passengers;

associating one or more of the software travel objects with configurable properties, wherein the configurable properties specify attributes of the accommodations, wherein one or more of the configurable properties comprises a dynamic configurable property whose attributes are travel segment-dependent, wherein associating the software travel objects with configurable properties further comprises:

associating a particular software travel object with a 'seat facing direction during travel' property, wherein the 'seat facing direction during travel' property specifies that, during the particular travel segment, the particular software travel object has a front facing attribute and, during a different travel segment, the particular software travel object has a rear facing attribute, wherein the front facing attribute indicates that an accommodation associated with the particular software travel object is facing forward during travel, and wherein the rear facing attribute indicates that the same accommodation associated with the particular software travel object is facing backward during travel;

receiving, through a user interface, information specifying an attribute for a particular travel segment, from among the travel segment-dependent attributes associated with the dynamic configurable property, to customize the dynamic configurable property for the particular travel segment, during run-time of a software application that manages travel reservations for the accommodations;

outputting the customized configurable properties for use by a user in a selection of one or more of the accommodations during a travel reservation;

determining that the particular travel segment has been completed, and based on determining that the particular travel segment has been completed, dynamically changing the attribute for the dynamic configurable property, from the attribute specified for the particular travel segment, to a different travel segment-dependent attribute associated with the dynamic configurable property.

6. The system of claim 5, wherein associating the software travel objects with configurable properties further comprises:

associating a particular software travel object with a level of service property, wherein the level of service property specifies that, during the particular travel segment, the particular software travel object has a first level of service attribute and, during a different travel segment, the particular software travel object has a different, second level of service attribute.

7. The system of claim 5, wherein associating the software travel objects with configurable properties further comprises:
associating a particular software travel object with an ambience property,
wherein the ambience property specifies that, during the particular travel segment, the particular software travel object has a social ambience attribute and, during a different travel segment, the particular software travel object has a quiet ambience attribute,
wherein the social ambience attribute indicates that an accommodation associated with the particular software travel object is located in an area designated for passengers who wish to talk to each other, and
wherein the quiet ambience attribute indicates that the same accommodation associated with the particular software travel object is located in an area designated for passengers who do not wish to talk to each other.

8. The system of claim 5, wherein associating the software travel objects with configurable properties further comprises:
associating a particular software travel object with a group designation property,
wherein the group designation property specifies that, during the particular travel segment, the particular software travel object has an 'assigned to group' attribute and, during a different travel segment, the particular software travel object has a 'not assigned to group' attribute,
wherein the 'assigned to group' attribute indicates that an accommodation associated with the particular software travel object is located in an area reserved for members of a designated group, and
wherein the 'not assigned to group' attribute indicates that the same accommodation associated with the particular software travel object is not located in an area reserved for members of any designated group.

9. A computer storage medium encoded with a computer program for providing customized attributes relating to a passenger's experience during travel that can be used to select accommodations when making travel reservations, the program comprising instructions that when executed by one or more computers cause the one or more computers to perform operations comprising:
defining, by one or more computers, software travel objects, wherein the software travel objects are configurable to represent a variety of types of accommodations used in transportation of passengers;
associating one or more of the software travel objects with configurable properties, wherein the configurable properties specify attributes of the accommodations, wherein one or more of the configurable properties comprises a dynamic configurable property whose attributes are travel segment-dependent, wherein associating the software travel objects with configurable properties further comprises:
associating a particular software travel object with a 'seat facing direction during travel' property
wherein the 'seat facing direction during travel' property specifies that, during the particular travel segment, the particular software travel object has a front facing attribute and, during a different travel segment, the particular software travel object has a rear facing attribute,
wherein the front facing attribute indicates that an accommodation associated with the particular software travel object is facing forward during travel, and
wherein the rear facing attribute indicates that the same accommodation associated with the particular software travel object is facing backward during travel;
receiving, through a user interface, information specifying an attribute for a particular travel segment, from among the travel segment-dependent attributes associated with the dynamic configurable property, to customize the dynamic configurable property for the particular travel segment, during run-time of a software application that manages travel reservations for the accommodations;
outputting the customized configurable properties for use by a user in a selection of one or more of the accommodations during a travel reservation;
determining that the particular travel segment has been completed, and
based on determining that the particular travel segment has been completed, dynamically changing the attribute for the dynamic configurable property, from the attribute specified for the particular travel segment, to a different travel segment-dependent attribute associated with the dynamic configurable property.

10. The computer storage medium of claim 9, wherein associating the software travel objects with configurable properties further comprises:
associating a particular software travel object with a level of service property,
wherein the level of service property specifies that, during the particular travel segment, the particular software travel object has a first level of service attribute and, during a different travel segment, the particular software travel object has a different, second level of service attribute.

11. The computer storage medium of claim 9, wherein associating the software travel objects with configurable properties further comprises:
associating a particular software travel object with an ambience property,
wherein the ambience property specifies that, during the particular travel segment, the particular software travel object has a social ambience attribute and, during a different travel segment, the particular software travel object has a quiet ambience attribute,
wherein the social ambience attribute indicates that an accommodation associated with the particular software travel object is located in an area designated for passengers who wish to talk to each other, and
wherein the quiet ambience attribute indicates that the same accommodation associated with the particular software travel object is located in an area designated for passengers who do not wish to talk to each other.

12. The computer storage medium of claim 9, wherein associating the software travel objects with configurable properties further comprises:
associating a particular software travel object with a group designation property,
wherein the group designation property specifies that, during the particular travel segment, the particular software travel object has 'assigned to group' attribute and, during a different travel segment, the particular software travel object has a 'not assigned to group' attribute,
wherein the 'assigned to group' attribute indicates that an accommodation associated with the particular software travel object is located in an area reserved for members of a designated group, and
wherein the 'not assigned to group' attribute indicates that the same accommodation associated with the particular software travel object is not located in an area reserved for members of any designated group.

* * * * *

UNITED STATES PATENT AND TRADEMARK OFFICE
CERTIFICATE OF CORRECTION

PATENT NO. : 7,908,158 B2 Page 1 of 1
APPLICATION NO. : 11/849829
DATED : March 15, 2011
INVENTOR(S) : William Christopher Stirlen It is certified that error appears in the above-identified patent and that said Letters Patent is hereby corrected as shown below:

On the Title page, at (75), line 2, please insert --Heinrich-- between "Walter" and "Mehl".

On the Title page, at (56), "OTHER PUBLICATIONS", line 3, delete "DYnamic" and replace with --Dynamic--.

Signed and Sealed this
Fourteenth Day of June, 2011

David J. Kappos
*Director of the United States Patent and Trademark Office*